Patented Jan. 22, 1946

UNITED STATES PATENT OFFICE 2,393,525

2,393,525

COMPOSITION OF MATTER FOR MAKING ROAD MARKERS, LAYING FLOORS, AND THE LIKE

Francis J. Farrell, Philadelphia, Pa., assignor, by mesne assignments, to Martin Lindabury and Glenn A. Lindabury, trading as H. R. Lindabury and Sons, and New Jersey Fence Company, Burlington, N. J.

No Drawing. Application August 14, 1942, Serial No. 454,878

1 Claim. (Cl. 106—199)

Until comparatively recently it has been the practice to paint the surfaces of city streets as well as highways in order to divide the same into traffic lanes or in order to indicate the direction in which traffic may turn, etc. The paint thus applied was obliterated by traffic in a relatively short period of time and had to be constantly renewed at great expense and effort. Also, painted lines, especially after a short period of use, lost a great deal of their visibility.

In order to circumvent this disadvantage it has heretofore been proposed to mark streets and highways by inserting thereinto nails having large heads or, more recently, it has been proposed to use rubber discs suitably fastened to the surface of the road. An example of the latter expedient can be found in my prior Patents Numbers 2,166,669 and 2,180,105.

In the present emergency, when rubber for this purpose is unobtainable and when adequate marking of roads for civilian and military traffic is most urgent, it becomes necessary to devise a substitute which is equally or more advantageous than rubber markers and which can be made from materials which do not conflict with national military needs.

Also in war production plants, especially where great accuracy is needed, it is essential that workmen be provided with adequate light without excessive glare which would result from the use of extremely high powered lights. To do this it is necessary to have very white flooring which will adequately reflect light instead of absorbing a great portion of the light as the case would be if the flooring was not a good reflector.

To this end I have devised a novel composition of matter which can be used for either of these two prime as well as for other purposes.

In making my novel material I utilize approximately 71% marble dust or any substitute having calcium carbonate as its predominant constituent, approximately 5% amorphous wax, approximately 12% pine rosin or natural or synthetic resin, approximately 4% castor oil, approximately 3% titanium dioxide and approximately 5% cellulose acetate or wood flour. A predetermined quantity of the ingredients mentioned in about the proportions stated is placed in a tightly sealed steam-jacketed mixer and is agitated under approximately 300° F. for about twenty-five minutes. This causes the various ingredients to fuse together to form a substance which is plastic so that it can be molded into shape while it is hot but which sets or hardens relatively quickly. The marble dust, I have found, has greater compatability and blending power with the other ingredients and seems to possess an amount of porosity which enables it, in a manner of speaking, to absorb the remaining ingredients. The titanium dioxide serves as a "bleacher" and increases the whiteness of the resultant product while the wax, rosin and oil serve as combined bonds and plasticizers. The cellulose acetate gives the product a certain amount of malleability as distinguished from brittleness thus increasing the toughness and preventing shattering. The resultant product has a coefficient of expansion and contraction very close to that of ordinary roads, has about the same coefficient of wear and, when laid in position in the hot state, forms a firm bond with the road bed.

When used as flooring it is preferable to preheat the section of the floor on which the composition is to be laid and then rapidly to transfer the composition while in the plastic state onto the floor to be covered. While the composition is still warm and plastic it is rolled or otherwise suitably tamped in position, the process being similar to the laying of concrete squares except that my composition has to be laid while it is hot and that it sets much more quickly than concrete. A floor so built has a whiter surface than when built of concrete so that it reflects more light thus saving in power consumption and affording better vision and is also easier to walk and stand on than concrete as it is more resilient and shock-absorbing.

In using my composition as a road marker an especially designed apparatus, which I will disclose in a separate application, is used for preheating a relatively narrow strip in the surface of the highway and simultaneously cutting a channel therein of the desired depth and width. This is done while the composition is being mixed and prepared and as the requisite channel is formed the prepared mixture is placed therein and tamped or otherwise rolled in position. In a very short time the marking strip thus formed has set and hardened so that it is available for traffic and a firm and water-tight bond is formed between the marking strip and the walls of the channel. If it is desired to place round spaced markers on the surface of the highway, the operation is the same except that instead of channels round recesses are formed into which the warm plastic composition is placed.

Having thus described my invention, what I claim as new and desire to secure by Letters Patent is:

A thermoplastic road marking material having substantially the same coefficient of expansion and contraction as a road surface, said material consisting of about 71% marble dust, 5% amorphous wax, 12% resin, 4% castor oil, 3% titanium dioxide and 5% wood flour.

FRANCIS J. FARRELL.